United States Patent
Ishino

(10) Patent No.: US 6,319,443 B2
(45) Date of Patent: *Nov. 20, 2001

(54) METHOD OF MANUFACTURING FIBER REINFORCED PLASTICS

(75) Inventor: Shigeo Ishino, Niwa-Gun (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,973

(22) Filed: Mar. 16, 1999

(30) Foreign Application Priority Data

Mar. 17, 1998 (JP) .................................................. 10-066653

(51) Int. Cl.$^7$ ........................................................ B32B 5/02
(52) U.S. Cl. .................... 264/136; 264/137; 264/211.14; 264/257; 156/180; 156/181; 427/434.7
(58) Field of Search ................................ 264/136, 211.14, 264/757, 137; 156/181, 180; 427/434.7

(56) References Cited

U.S. PATENT DOCUMENTS

| 3,855,031 | * | 12/1974 | McNeely et al. | ..................... 156/190 |
| 4,481,056 | * | 11/1984 | Kuhl | ..................... 156/180 |
| 5,104,698 | * | 4/1992 | Hayashi et al. | ..................... 427/365 |
| 5,114,633 | * | 5/1992 | Stewart | ..................... 264/23 |
| 5,176,775 | * | 1/1993 | Montsinger | ..................... 156/181 |

FOREIGN PATENT DOCUMENTS

| 361211022A | * | 9/1986 | (JP) . |
| 4-305439 | | 10/1992 | (JP) . |
| 7-117141 | | 5/1995 | (JP) . |

* cited by examiner

Primary Examiner—Jan H. Silbaugh
Assistant Examiner—Edmund H. Lee
(74) Attorney, Agent, or Firm—Burr & Brown

(57) ABSTRACT

A method of manufacturing fiber reinforced plastics comprising immersing fibers into an immersing tank containing resin, moving the fibers through the immersing tank along a direction in which the fibers are aligned at a speed that is substantially equal to a rate of capillary infiltration of the resin into the fibers, and drawing the fibers into a die to cure the resin.

3 Claims, 3 Drawing Sheets

FIG_1
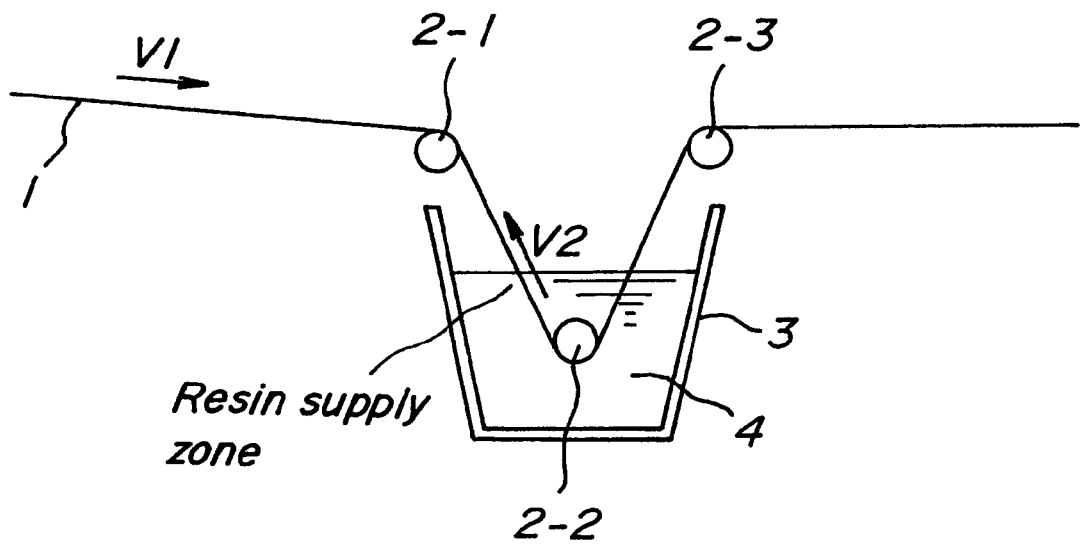
V1: Moving speed of fibers for reinforcing
V2: Immersing speed of resins

FIG._2
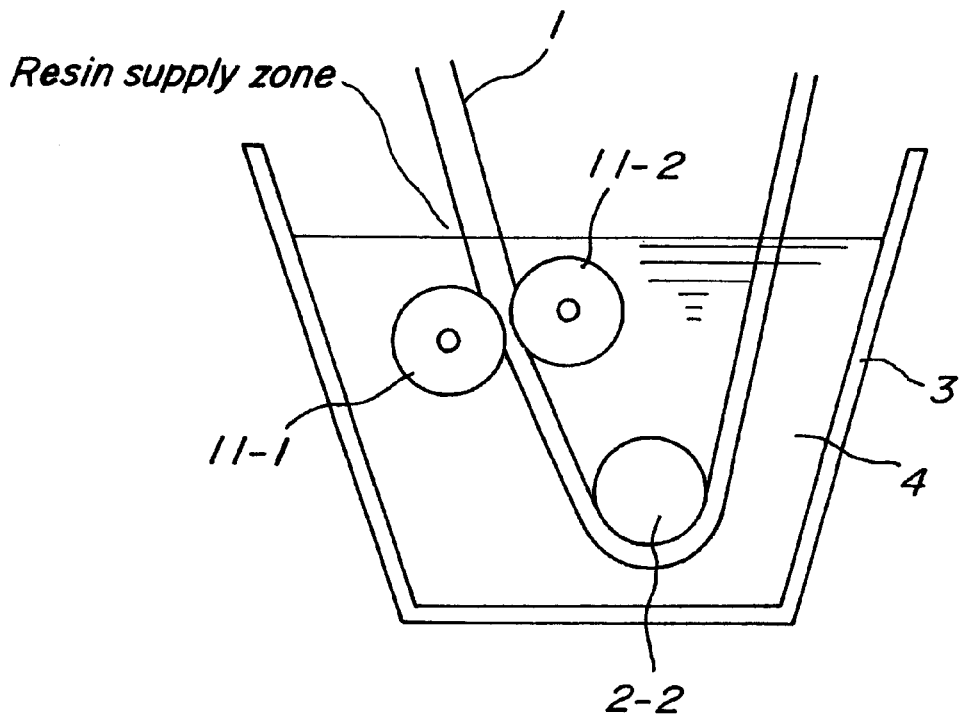
FIG._3
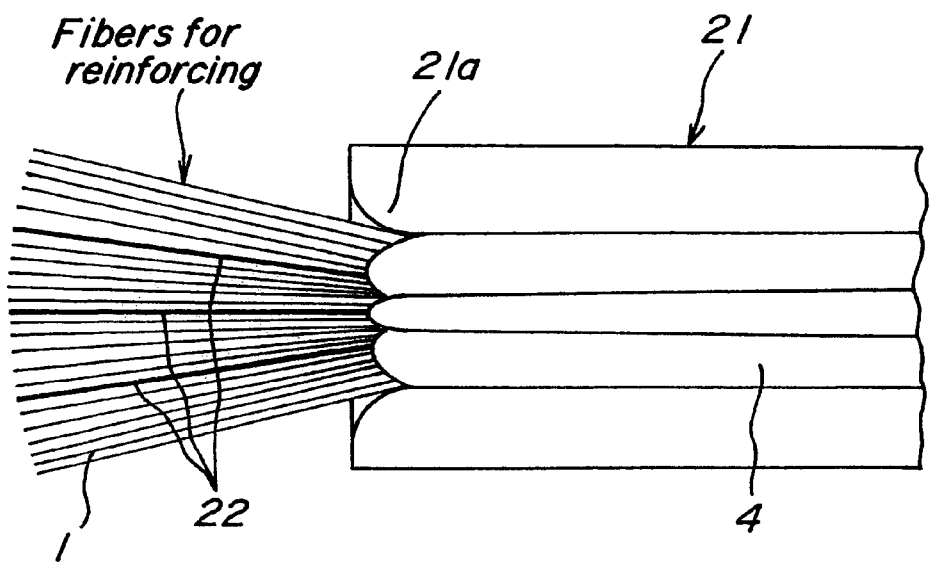

FIG_4
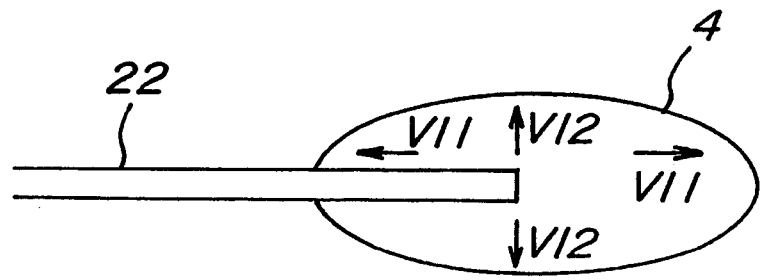
FIG_5
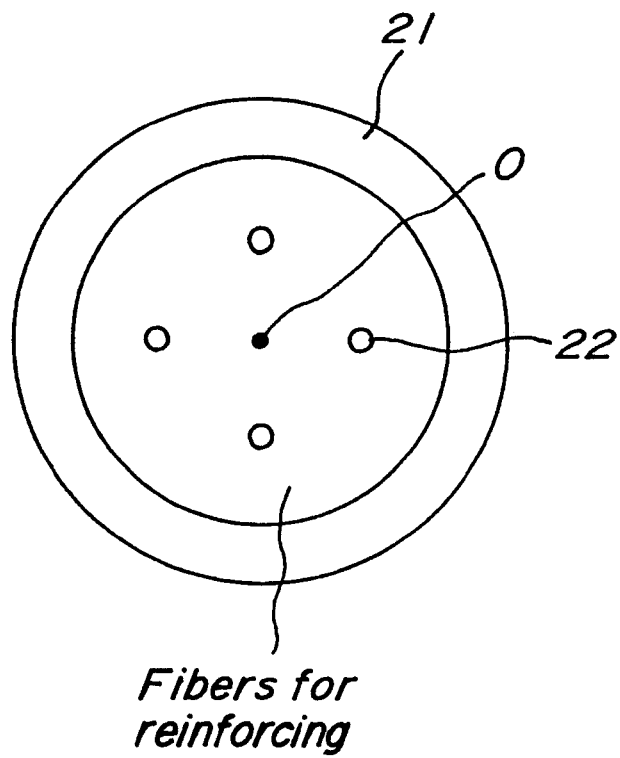
Fibers for reinforcing

METHOD OF MANUFACTURING FIBER REINFORCED PLASTICS

BACKGROUND OF THE INVENTION

1. Field of the Invention

The present invention relates to a method of manufacturing fiber reinforced plastics ("FRP") by means of a drawing method which is especially suited for a polymer insulator.

2. Description of Related Art

FRP, in which glass roving aligned in one direction to which thermosetting resins are immersed and the resins are cured, is light in weight and has a high strength. Therefore, it is preferably used as a core member of a polymer insulator for a power-transmission line or the like. There is known in the art a well known manufacturing method for drawing such an FRP having the steps of: aligning a fiber itself or a plurality of fibers for reinforcing such as roving, yarn, mat, cloth or the like, immersing liquid resins into the fiber or the fibers by passing it or them in a resin supply zone, and curing the resins by means of thermosetting reaction by passing it, in a die to obtain a forming product having a continuous and same cross section.

In the known drawing method mentioned above, bubble inclusions are liable to be generated in the resins during passing of the fibers through the resin supply zone. In addition bubble inclusions also occur because the plurality of fibers is aligned in one direction to which resins are immersed and are drawn in such a manner that the fibers shrink at an inlet of the die. Therefore, there is the drawback that a forming product including bubbles is hardened as is. In order to eliminate the bubble inclusion problem, there is known a method of degassing by means of a vapor degassing step arranged prior to the drawing step using the die (JP-A-4-305439) and a method of removing bubbles by using a plurality of divided paths for passing forming materials arranged at an inlet side of the die (JP-A-7-117141).

The known methods mentioned above show a sufficient corrosion resistivity and mechanical properties required for a general construction member. However, when the inventors used the thus obtained FRP as the core member of the polymer insulator for a high voltage electric insulation member, it was discovered that the an electric insulation breakage property of the FRP was not sufficient. After examining the FRP in detail, it was found that a plurality of invisible slender micro-gaps were generated in the FRP and those micro-gaps affect the electric insulation breakage property. Moreover, if the slender micro-gaps remain in and between single fibers, the fibers, including air, are supplied into the die. In this case, it was found that the electric insulation property is affected since such air is extended in or between the fibers when the fibers shrink at the inlet of the die.

SUMMARY OF THE INVENTION

It is a primary object of the invention is to eliminate the drawbacks mentioned above and to provide a method of manufacturing fiber reinforced plastics which can provide the FRP's preferred for high voltage electric insulation members such as an insulator or the like.

According to the invention, a method of manufacturing fiber reinforced plastics by means of a drawing method having the steps of immersing resins into fibers for reinforcing aligned in one direction, which are supplied continuously, and curing the resins immersed in the fibers by drawing the fibers into a die, comprises a step of: moving the fibers in a resin supply zone at a substantially same speed as that of resin immersing in the fibers along a direction in which the fibers are aligned.

In the present invention, the fibers for reinforcing, which are a gathering of members of plural single fiber, are moved in the resin supply zone at a substantially same speed as that of resin immersion in the fibers along the direction in which the fibers are aligned. Therefore, it is possible to manufacture the FRP with no bubbles in the fibers for reinforcing. As a result, it is possible to obtain the FRP preferred as the high voltage electric insulation member such as insulator or the like. In the present invention, the term "immersing speed" means generally a moving speed based on a capillary motion of resins in and between single fibers for reinforcing. When the fibers for reinforcing are compressed by a roller during the resin immersing step or when a plurality of fibers for reinforcing, are immersed in resin the term "immersing speed" means total speed of the above moving speed based on the capillary motion and the resin moving speed due to the mechanical compression of the fibers for reinforcing.

BRIEF DESCRIPTION OF THE DRAWINGS

FIG. 1 is a schematic view showing one embodiment of a method of manufacturing fiber reinforced plastics according to the invention;

FIG. 2 is a schematic view illustrating one preferable embodiment of the method shown in FIG. 1;

FIG. 3 is a schematic view depicting another embodiment of the method of manufacturing fiber reinforced plastics according to the invention;

FIG. 4 is a schematic view for explaining an immersing speed of resins in the fibers for reinforcing; and FIG. 5 is a schematic view showing one preferable embodiment of an arrangement of resin supply tubes.

DESCRIPTION OF THE PREFERRED EMBODIMENT

FIG. 1 is a schematic view showing one embodiment of a method of manufacturing fiber reinforced plastics according to the invention. In the embodiment shown in FIG. 1, fibers for reinforcing before the resin immersing step are gathered. Numerals 2-1, 2-2 and 2-3 are guides for introducing the fibers 1 into a resin supply zone. Numeral 3 is an immersing tank forming the resin supply zone. Numeral 4 is resins into which fibers are immersed maintained in the immersing tank 3. In this embodiment, only the resin supply zone is shown. The FRP is manufactured according to a drawing method by supplying the fibers 1, in which resins are immersed in the resin supply zone, into a die not shown before the resins are hardened, and curing the resins in the fibers 1 in the die.

A feature of the present invention is that the fibers 1 for reinforcing are moved in the resins 4 in the immersing tank 3 forming the resin supply zone in such a manner that a moving speed V1 of the fibers 1 is substantially equal to an immersing speed V2 of the resins 4 along a direction in which the fibers 1 are aligned. That is to say, the moving speed V1 of the fibers 1 is controlled in such a manner that VI is substantially equal to V2. In this embodiment, the immersing speed V2 is a moving speed based on a capillary motion of the resins 4 immersed in the fibers 1.

Plural fibers 1, in which the resins 4 are immersed according to the method mentioned above, are gathered in the die before the resins 4 are hardened. In this case, it is possible to gather the plural fibers 1 in the die in such a manner that bubbles are removed from the resins 4 in the fibers 1. Therefore, it is possible to manufacture a FRP in which no bubbles remain.

FIG. 2 is a schematic view showing one preferable embodiment of the method of manufacturing fiber reinforced plastics according to the invention. In the embodiment shown in FIG. 2, portions similar to those in FIG. 1 are denoted by the same reference numerals as those in FIG. 1, and the explanations thereof are omitted here. In the embodiment shown in FIG. 2, a pair of rollers 11-1 and 11-2 for compressing the fibers 1 are arranged in the resins 4 in the immersing tank 3 forming the resin supply zone at a vicinity of an inlet of the fibers 1. As shown in FIG. 4, if the fibers 1, in which the resins 4 are immersed, are compressed, the resins 4 are extruded from the fibers 1 along the same direction as that of a resin moving due to a capillary motion. Therefore, the immersing speed V2 of the resins 4 in the fibers 1 can be made faster by extruding resins 4. As a result, it is possible to set the moving speed V1 of the fibers 1 faster, and thus a productivity of the FRP can be improved.

In the embodiment shown in FIG. 2, it is necessary to arrange the rollers 11-1 and 11-2 in the resins 4 in the immersing tank 3 at a vicinity of an inlet of the fibers 1. The reasons for limiting the roller arranging position are as follows. If the resins 4 are not introduced to the fibers at an inlet of the fibers into the tank an compression cannot be obtained. In addition, if the compression is performed after a long time from the start of the immersing the immersing speed V2 cannot be made faster.

FIG. 3 is a schematic view showing another embodiment of the method of manufacturing fiber reinforced plastics according to the invention. In the embodiment shown in FIG. 3, plural fibers 1 are directly introduced into a die 21 as a bundle of the fibers 1, the resins 4 are immersed in the fibers 1 at an inlet 21a of the die 21 continuously. That is to say, a plurality of resin supply tubes 22 are arranged in the bundle of the fibers 1 aligned in one direction at the inlet 21a of the die 21, and an amount of resins supplied from the resin supply tubes 22 is controlled in accordance with a drawing speed i.e. a moving speed of the bundle of the fibers 1. In this embodiment, when the bundle of the fibers 1 is supplied into the die 21, compression is applied to the bundle of the fibers 1 by the die 21, and the die 21 serves as the rollers shown in FIG. 2. Therefore, it is possible to improve a productivity as is the same as the embodiment shown in FIG. 2.

Then, a control of an amount of the resins 4 supplied from the resin supply tubes 22 will be explained. At first, as shown in FIG. 4 which shows an embodiment in which four resin supply tubes 22 are used, an immersing speed V11 of the resins 4 due to a capillary motion in and between the fibers 1 along a direction in which the fibers 1 are aligned, is measured previously by supplying a constant amount of resins 4 from a tip of the resin supply tubes 22 arranged in the bundle of the fibers 1 which are not moved. In this case, the resins 4 are immersed in a direction perpendicular to the fiber aligned direction mentioned above at an immersing speed V12 which is slower than the immersing speed V11. The immersing speed V2 of the resins 4 which is used for controlling is determined from the immersing speed V11 in consideration of an effect of compression by the die 21.

Then, in an actual manufacturing according to the invention, since the moving speed V1 of the bundle of the fibers 1 can be known, an amount of the resins 4, at which the thus determined immersing speed V2 is substantially equal to the known moving speed V1, is determined, and the resins 4 are supplied from the resin supply tubes 22 at the thus determined amount of the resins 4.

In the embodiment shown in FIG. 3, a plurality of the resin supply tubes 22 are arranged. The reasons are as follows. That is to say, as shown in FIG. 4, the immersing speed of the resins 4 supplied in the bundle of the fibers 1 is fast along the direction in which the fibers 1 are aligned (V11) and is slow along the direction perpendicular to the fiber aligned direction (V12). Therefore, a plurality of the resin supply tubes 22 are preferably used so as to introduced the resins 4 uniformly in respective fibers 1 and between the fibers 1. Moreover, as an arrangement of the resin supply tubes 22, as shown in FIG. 5 illustrating a cross section of the die 21, if a plurality of the resin supply tubes 22 are arranged at symmetric positions around a center axis O of the die 21, the resins 4 are uniformly introduced to the fibers 1 and between the fibers 1.

As maybe understood from the above explanations, according to the invention, since the fibers for reinforcing, which are a gathering of a plurality of single fibers are moved in the resin supply zone at substantially the same speed as that of resin into which the fibers are immersed and along the direction in which the fibers are aligned, it is possible to manufacture an FRP with no bubbles in the fibers for reinforcing. As a result, it is possible to obtain a FRP which is preferred for high voltage electric insulation members such as an insulator or the like.

What is claimed is:

1. A method of manufacturing fiber reinforced plastics comprising:

immersing fibers into an immersing tank containing resin;

compressing said fibers with a pair of rollers positioned in said immersing tank proximate an inlet where the fibers enter the immersing tank;

moving said fibers through said immersing tank along a direction in which the fibers are aligned at a speed that is substantially equal to the sum of a rate of capillary infiltration of the resin into the fibers along said direction and a resin moving speed due to the mechanical compression of said fibers with said pair of rollers; and drawing said fibers into a die to cure said resin.

2. A method of manufacturing fiber reinforced plastics comprising:

continuously introducing a bundle of fibers at a moving speed into an inlet of a die; and supplying an amount of resin to said bundle of fibers from a plurality of resin supply tubes positioned in said bundle of fibers at said inlet, said amount of resin being controlled in accordance with said moving speed.

3. The method according to claim 2, wherein the resin supply tubes are arranged at symmetric positions around a center axis of the die.

* * * * *